United States Patent [19]
Cheng

[11] Patent Number: 4,765,646
[45] Date of Patent: Aug. 23, 1988

[54] COLLAPSIBLE SHOPPING CART
[76] Inventor: Karen Cheng, No. 10, Alley 8, Lane 1, Hsiu Lang Road, Yung Ho City, Taipei Hsien, Taiwan
[21] Appl. No.: 946,916
[22] Filed: Dec. 22, 1986
[51] Int. Cl.$^4$ .............................................. B62B 11/00
[52] U.S. Cl. ..................................... 280/651; 301/1; 301/113
[58] Field of Search .................. 301/1, 112, 113, 122; 280/641, 645, 651, 652, 654, 659, DIG. 3, DIG. 4

[56]  References Cited
U.S. PATENT DOCUMENTS

| 176,743 | 5/1876 | Garth et al. | 301/113 |
| 895,842 | 8/1908 | Chamber, Jr. | 301/113 X |
| 2,377,815 | 6/1945 | Sides et al. | 280/641 |

FOREIGN PATENT DOCUMENTS 276380  10/1964  Netherlands .................. 280/652

Primary Examiner—John J. Love
Assistant Examiner—Michael Mar
Attorney, Agent, or Firm—Lowe, Price, LeBlanc, Becker & Shur

[57]  ABSTRACT

This invention relates to a collapsible shopping cart and in particular to one comprising a basket having a base support which enables it to sustain heavy loads without deforming and wheel assemblies which is easy to fit on the bottom of the basket, whereby the cart can receive, store and transport heavy articles. Furthermore, the cart is provided with wheels which are easily assembled.

3 Claims, 7 Drawing Sheets

COLLAPSIBLE SHOPPING CART

BACKGROUND OF THE INVENTION

Although various collapsible shopping carts have been previously manufactured to enable them to be conveniently carried and to occupy a small storage space, it has been found that they are mostly of intricate folding construction causing problems to the user. In addition, they are composed of many linking parts and so the electroplating thereof is easily damaged by friction in operation. Furthermore, the importance of the strength of the base support has been overlooked, resulting that they can no longer be folded after being used for a certain period of time. Moreover, the caster assembly of such carts is difficult to fit together and easy to drop out.

It is, therefore, an object of the present invention to provide an improved collapsible shopping cart which may obviate and mitigate the above-mentioned drawbacks.

SUMMARY OF THE INVENTION

This invention relates to an improved collapsible shopping cart.

It is the primary object of the present invention to provide a collapsible shopping cart which is simple in operation.

It is another object of the present invention to provide a collapsible shopping cart which is easy to operate.

It is still another object of the present invention to provide a collapsible shopping cart which is sturdy in construction.

It is still another object of the present invention to provide a collapsible shopping cart which can receive, store and transport heavy articles.

It is a further object of the present invention to provide a collapsible shopping cart the wheels of which are easy to be assembled.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present invention is mainly characterized by two points; one is the base support, and the other is the caster assembly.

Figure 1:
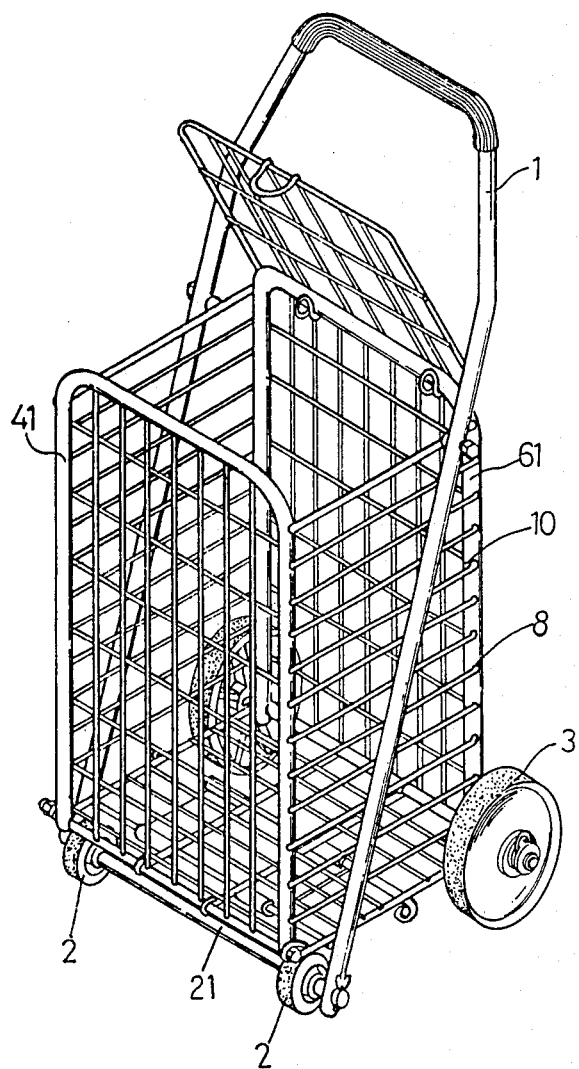
FIG. 1 is a perspective view of a collapsible shopping cart according to the present invention.
Figure 2:
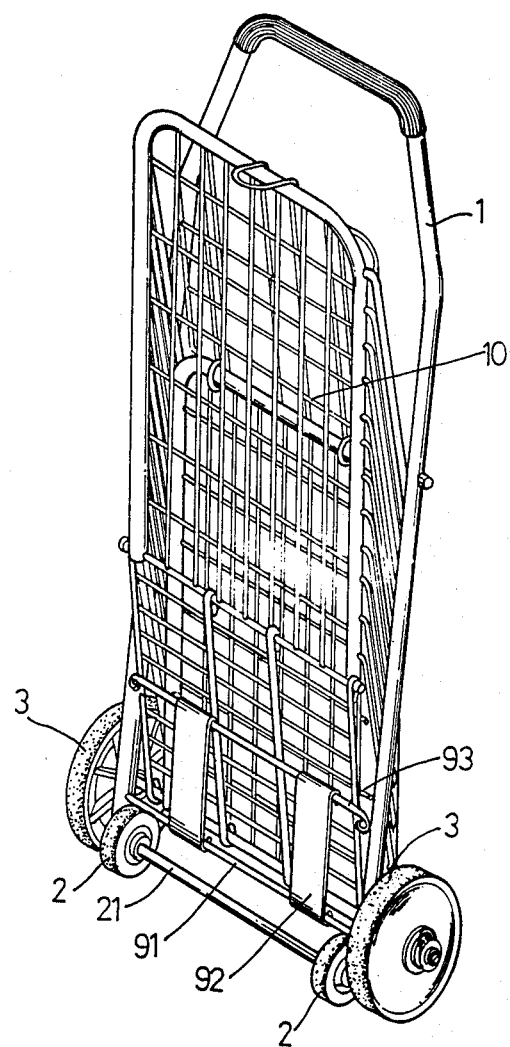
FIG. 2 is a perspective view of the collapsible shopping cart in folded position.

With reference now to the drawings and in particular to FIGS. 1 and 2 thereof, the basket 10 of the present invention can be collapsed in such a way that the rear of the basket is held in substantially the same plane as the front of the basket while the front wheels 2 are held between the rear wheels 3.

Referring to FIG. 1, there is shown the present invention being in fully opened position. As illustrated, the present invention comprises a basket 10 having a front net 4, a lower net 5, a rear net 6 and an upper net 7 pivotally connected together. The front net 4 and the rear net 6 are joined together by a plurality of links 8. Two ends of the link 8 are bent so as to pass through corresponding holes of the front frame 41 and rear frame 61, and then pressed to make sure that they will not drop out of the frames 41 and 61. Thus, the ends of the links 8 may rotate with respect to the frames 41 and 61 thereby enabling the bracket 10 to be folded up.

Figure 3:
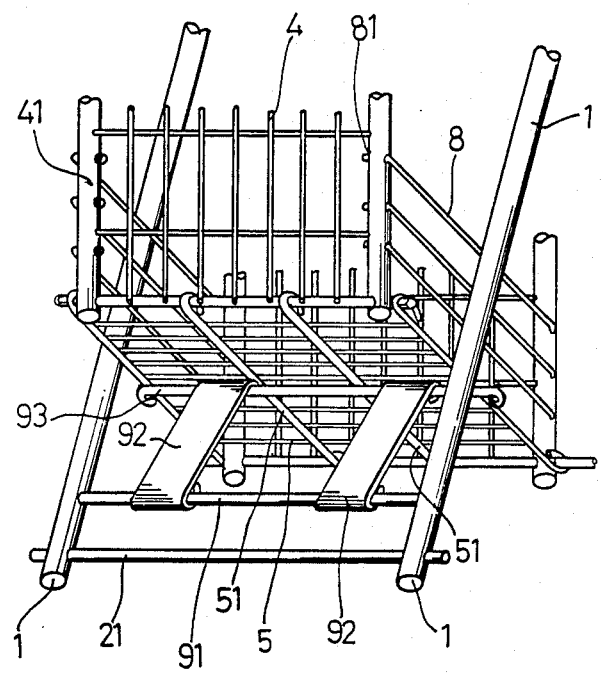
FIG. 3 is a fragmentary view showing the structure of the base support.

Referring to FIG. 3, there is shown a fragmentary view showing the structure of the base support according to the present invention. The structure of the base support is the main characteristic of the present invention. As can be seen, there is a fixed rod 91 mounted above and in parallel to an axle 21. There is a distance between the fixed rod 91 and the front wheels 2 so that the rotation of the wheels 2 will not be effected. Furthermore, two swing plates 92 are connected across the fixed rod 91 and a transverse rod 93 located under the lower net 5. By means of the two swing plates 92, the present invention can receive heavy articles. It should be noted that, however, the number of the swing plates 92 depends on the weight desired to be supported by the shopping cart.

Figure 4:
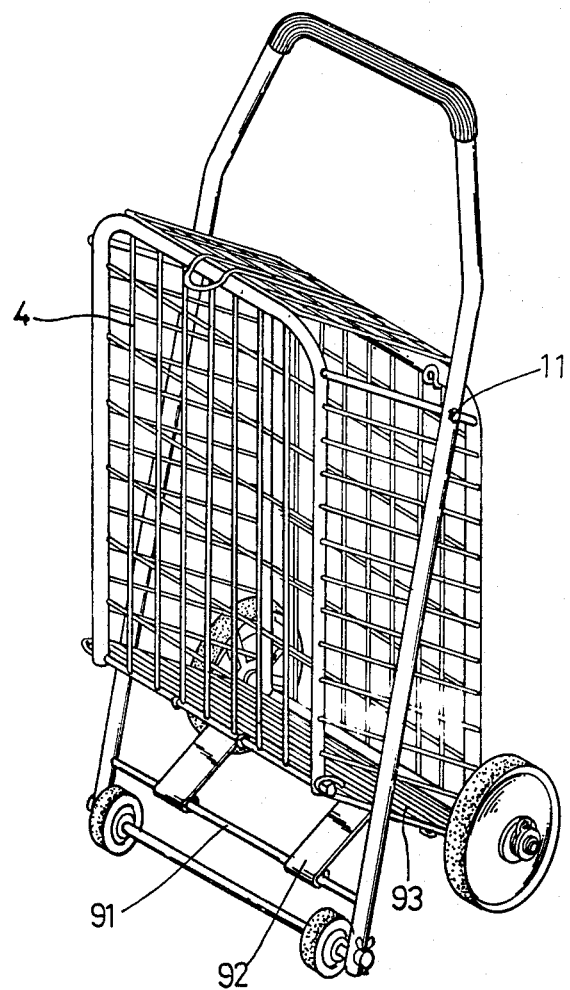
FIG. 4 is a perspective view of the collapsible shopping cart in partially opened position.

Looking now at FIG. 4, the present invention is shown in partially opened position. When the present invention is being collapsed, the links 8 will rotate about pivot 11 and the transverse rod 93 and the swing plates 92 will rotate with respect to the fixed rod 91. Hence, it is only necessary to pull up the front net 4 when desired to fold up the present invention. In addition, it is obvious that the present invention will not sustain high friction when opened and collapsed.

With reference to FIG. 1 again, when the present invention is opened, the longitudinal rods 51 of the net 5 will evenly locate on the fixed rod 91 and by means of the transverse rod 93 and the swing plates 92, the bracket 10 can bear heavy loads without deforming.

Figure 5:
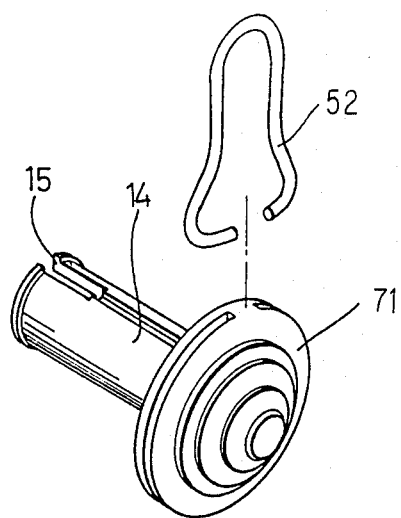
FIG. 5 is an exploded view of a wheel assembly according to the present invention.

Referring to FIG. 5, there is shown, the wheel assembly which is the second characteristic of the present invention. As shown, the wheel assembly comprises a circular member 71, an axle 14 connected to the inner side of the circular member 71, and a clip 2 fastening the axle 14 to the circular member 71. The axle 14 is formed with a slot 15 the outer diameter of which is greater than hub (not shown) so that the axle 14 can be force-fitted thereon.

Figure 6:
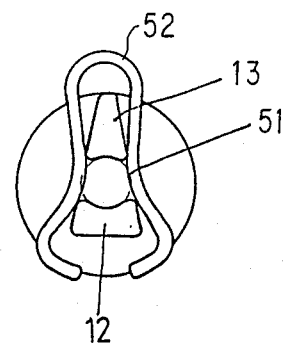
FIG. 6 shows the structure of inner end of the circular member of the wheel assembly.
Figure 7:
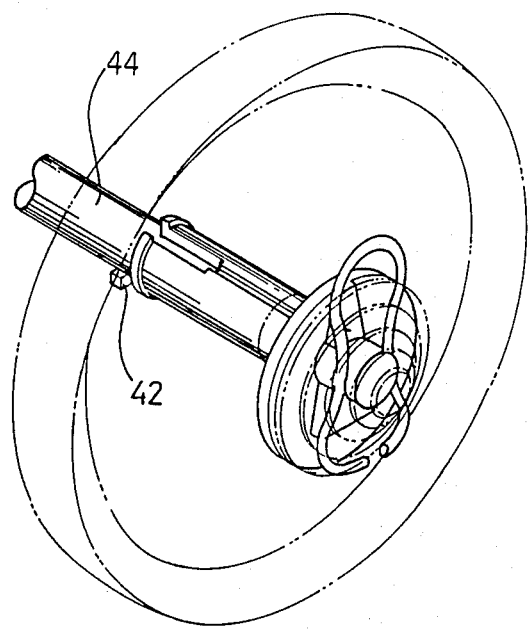
FIG. 7 is a perspective view showing the assembly of the wheel.
Figure 8:
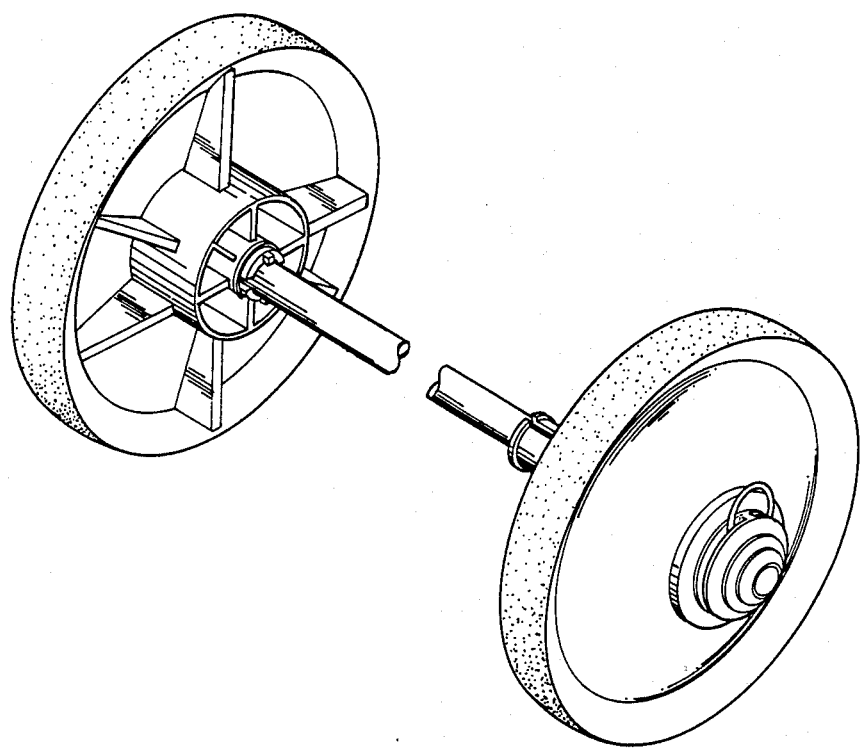
FIG. 8 shows an embodiment of the wheel assembly.

The structure of inner end of the circular member 71 is shown in FIG. 6. The inner end is provided with two protuberances 12 and 13; the lower one 12 is trapezoid while the upper one 13 is triangular. The protuberances 12 and 13 are designed so that the clip 52 can be just fitted therewith. As seen, the concave portion of the clip 52 is fitted into an axle hole 151 of the axle 14.

In use, the present invention is first mounted at the center of the hub and then inserted by a shaft 44. The shaft is provided with projections 42 at appropriate positions so as to prevent the axle 14 from dropping out. As a result, the wheel can be safely kept in place.

Although this invention has been described with a certain degree of particularity, it is understood that the present disclosure is made by way of example only and that numerous changes in the detail of construction and the combination and arrangement of parts way be resorted to without departing from the spirit and scope of the invention as hereinafter claimed.

I claim:

1. In a collapsible shopping cart having a basket, a handle, and a pair of front and rear wheel assemblies, the basket comprising a front mesh panel surrounded by an inverted U-shaped frame, a rear mesh panel surrounded by an inverted U-shaped frame, a plurality of links connected between the frames of said front and rear mesh panels, a first transverse rod connected between the lower ends of the inverted U-shaped frame of said front mesh panel, a rear axle connected between the lower ends of the inverted U-shaped frame of said rear mesh panel and extending outwardly therefrom, said pair of rear wheel assemblies being secured to the ends of said rear axle, a lower mesh panel secured between said front and rear mesh panels, a pair of spaced longitudinal rods connected between said first transverse rod and said rear axle, a second transverse rod secured beneath said lower mesh panel and said longitudinal rods and being located substantially midway between said front and rear mesh panels, said handle having an inverted U-shape with downwardly extending leg portions, a front axle secured between the lowermost ends of said leg portions, said pair of front wheel assemblies being secured to said front axle, a third transverse rod connected between said leg portions at a spaced location above said front axle, two planar swing plates pivotally connected between said second transverse rod and said third transverse rod, and means for pivotally connecting an uppermost link on each side of said basket to a respective leg of said handle.

2. The collapsible shopping cart as claimed in claim 1, wherein each said rear wheel assembly comprises a circular member, for receiving a respective end of said rear axle and a clip for fastening the axle to the circular member.

3. The collapsible shopping cart as claimed in claim 2, wherein said circular member has an axle hole and two vertically spaced protuberances, the upper one of said protuberances being triangular in shape while the lower one thereof is a trapezoid.

* * * * *